March 16, 1965 HANS-JOACHIM DREYER ETAL 3,174,135

PROGRAM-CONTROLLED ELECTRONIC DATA-PROCESSING SYSTEM

Filed Feb. 25, 1959 6 Sheets-Sheet 1

INVENTOR.
H.DREYER-R.BASTEN-G.PORST

BY Robert Harding Jr.
ATTORNEY

PROGRAM-CONTROLLED ELECTRONIC DATA-PROCESSING SYSTEM

Filed Feb. 25, 1959 6 Sheets-Sheet 2

INVENTOR.
H.DREYER-R.BASTEN-G.PORST

BY Robert T. Hardey Jr.
ATTORNEY

March 16, 1965 HANS-JOACHIM DREYER ETAL 3,174,135

PROGRAM-CONTROLLED ELECTRONIC DATA-PROCESSING SYSTEM

Filed Feb. 25, 1959 6 Sheets-Sheet 3

INVENTOR.

H. DREYER - R. BASTEN - G. PORST

BY Robert Harding Jr.

ATTORNEY

PROGRAM-CONTROLLED ELECTRONIC DATA-PROCESSING SYSTEM

Filed Feb. 25, 1959

INVENTOR.
H.DREYER-R.BASTEN-G.PORST
BY Robert Harding Jr.
ATTORNEY

PROGRAM-CONTROLLED ELECTRONIC DATA-PROCESSING SYSTEM

Filed Feb. 25, 1959 6 Sheets-Sheet 5

INVENTOR.
H. DREYER - R. BASTEN - G. PORST
BY Robert Harding Jr.
ATTORNEY

March 16, 1965 HANS-JOACHIM DREYER ET AL 3,174,135
PROGRAM-CONTROLLED ELECTRONIC DATA-PROCESSING SYSTEM
Filed Feb. 25, 1959 6 Sheets-Sheet 6
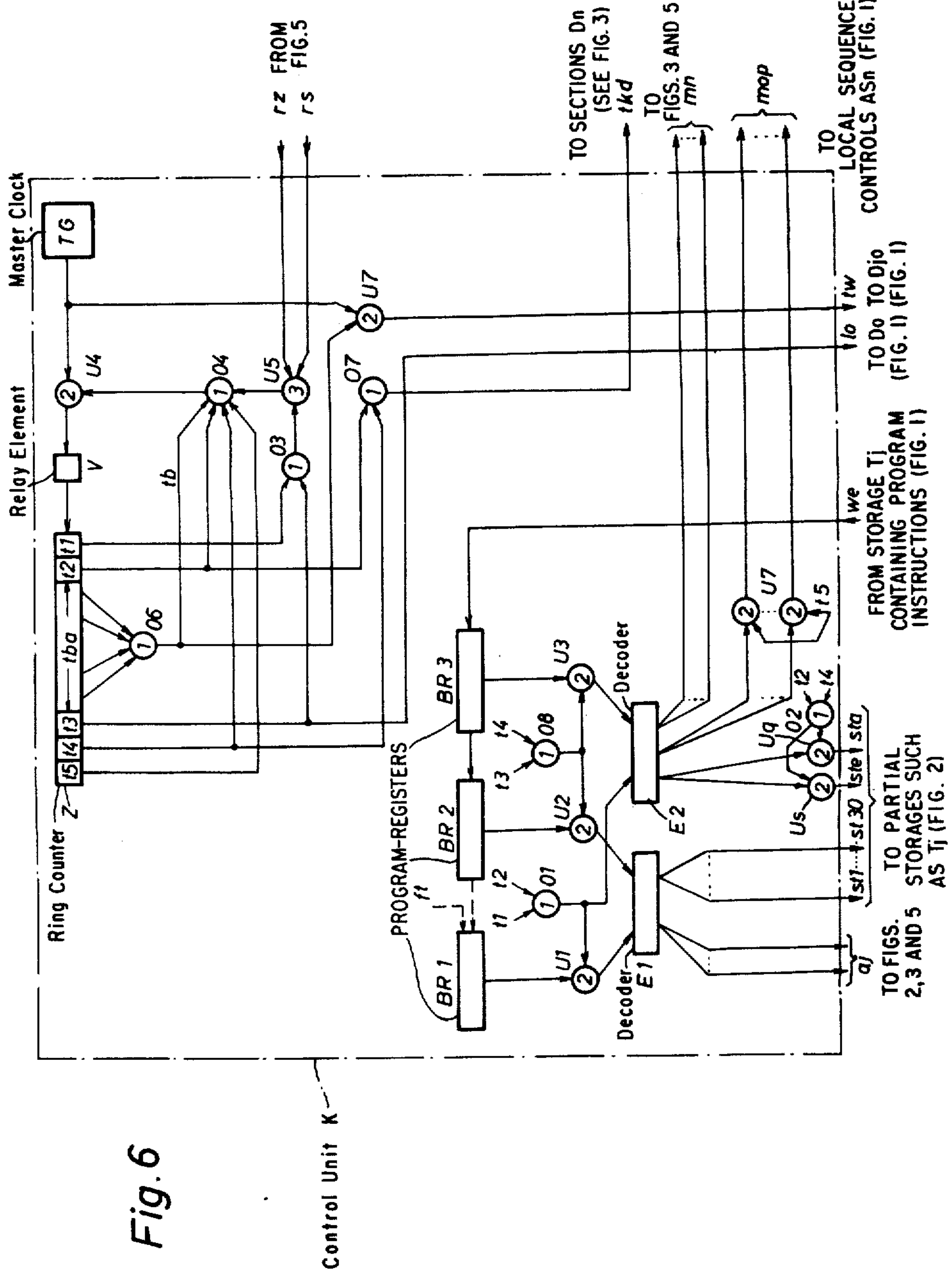
INVENTOR.
H.DREYER-R.BASTEN-G.PORST
BY Robert Harding Jr.
ATTORNEY.

United States Patent Office 3,174,135

Patented Mar. 16, 1965

3,174,135

PROGRAM-CONTROLLED ELECTRONIC DATA-PROCESSING SYSTEM

Hans-Joachim Dreyer, Korntal, Rolf Basten, Stuttgart-Zuffenhausen, and Gottfried Porst, Stuttgart-Weil im Dorf, Germany, assignors to International Standard Electric Corporation, New York, N.Y., a corporation of Delaware Filed Feb. 25, 1959, Ser. No. 795,479
Claims priority, application Germany, Mar. 1, 1958, St 13,489
24 Claims. (Cl. 340—172.5)

This invention relates to an electronic data processing system, comprising a central control unit serving the program-control purposes as well as a working storage, in which there are provided several data processing units, such as calculator and sorting units, as well as different backing storage units, such as magnetic-drum storage devices and magnetic-tape storage devices, and several input and output units.

In systems of the above type it is often desirable to simultaneously carry out various operations, Thus, during the performance of a calculating program, the preparation of the next program is supposed to be carried out, in particular the reception and conversion of input data, which are supplied by relatively slow-operating input devices, e.g. by a tape transmitter. The output or feeding-out of the results, as obtained during the preceding calculating program, e.g. via punched cards or printing devies, is supposed to be effected together with these above mentioned operations.

In one conventional system of this type, the individual function elements are provided with separate control or program registers and are adapted to operate substantially autonomously. The controlling of such systems is effected via a central unit comprising a high-speed memory or quick-access storage device and a program distributor. This program distributor serves to transfer the individual instructions (orders) to the individual function elements (parts of the unit) and, if so required, to automatically carry out certain order conversions. Furthermore, the distributor is adapted to connect the various instruction circuits with each other.

Although, in the conventional electronic system, it is substantially possible to simultaneously perform and control several operations, there arise considerable difficulties when reducing it to practice, especially on account of the fact that the expense for the program supervision is multiplied. Above all in such a case additional supervisory arrangements or instructions are required which are supposed to prevent a mutual overtaking of individual partial programs. In order that the central unit can perform its supervising function, it is further necessary to provide a special logical calculator unit by which certain control instructions are analysed or converted respectively. Also, to this end, an additional investment in circuitry is required. Altogether, from the interlacing of the programs at a simultaneous operation of different function units, numerous supervising and controlling operations result, all of which lead to a complicated construction of the control unit which is then susceptible to interferences.

The invention is based on the problem of improving the construction of a program-controlled electronic system in such a way that the simultaneous performance of different programs or operations, sorting passes, and the like, is enabled, without effecting the controlled performance of the individual programs by reciprocal waiting times. It has been found that one of the major difficulties is the access to the high-speed or quick access storage, as provided at the central point, as well as in the access to the buffer storages of the individual function or data processing units.

According to the invention, these disadvantages are avoided in the electronic system comprising a central control unit serving program-control purposes, as well as a working storage, and one or more data-processing units, backing-storage units, and input-output units, in that the working storage is subdivided in several partial storage devices, and in that an electronic crossbar switch is provided for establishing the simultaneously existing connections between various partial storages and various units. In a system according to the invention it is appropriate to provide each of the units with a local sequence-control device of its own, capable of being marked in accordance with the desired function sequence, and to provide each of the partial storage devices with an access-control device of its own capable of being set in accordance with the desired addresses. In this case the central control unit is appropriately arranged in such a way that it will control the establishment of the connections, that it will set the access control of the respective partial storage device, and will release the desired function sequence by marking the sequence control in the respective unit.

The employment of the electronic crossbar switch with a system according to the invention enables the simultaneous connection between various units and various partial storage devices of the working storage. In this way special buffer storages for the individual units are no longer required. Of course, it may become necessary, e.g. for speed adaptation purposes, to provide some of the units with an input register which is e.g. designed as a shift register. However, such input registers which are merely required for functional reasons, cannot be actually regarded as buffer storages. In fact, larger types of buffer storages are provided whenever the respective unit is supposed to be engaged for a longer time on the processing of a large amount of information data, and is supposed to work on its own during this time, as is the case e.g. with printing units. Furthermore, buffer storages have to be provided for the blockwise conversion of informations between two units which cannot be operated synchronously. Additional transimission times are required for the conversion of informations into and from such buffer storages.

These losses of time are also avoided by the employment of the crossbar switch, because, by means of a simple switchover operation, the partial storage devices can be interchanged at will among each other. For example, if a greater amount of informations is supposed to be sorted, then the contents of a magnetic-tape storage device can be transferred en bloc to individual partial storage devices, and can be simultaneously sorted en bloc from one of these partial devices via a sorting unit into another partial storage device. Simultaneously, however, another partial storage device, in connection with a calculator unit and under the control of the control unit, can perform a calculating program.

In order to avoid double connections at the intersecting points of the crossbar switch, the system according to the invention is appropriately designed in such a way that the control unit comprises a sequence control of its own, as well as a sequence control device composed of blocking and unblocking circuits, that the sequence control, with respect to each step of the program, passes through a restricted sequence of circuit conditions, of which each one is assigned to one operating cycle, and that said sequence-control device, being controlled by return indications derived from the position of the crossbar switch, supervises the sequence of the operating cycles. For controlling the sequence-control circuit there is appropriately used a return indicating system which is connected with the control system of the crossbar switch.

For this reason, in the system according to the invention, a connecting control and a connecting control circuit are provided for the controlling of the crossbar switch. These arrangements cooperate in such a way with the control unit that the sequence-control circuit will only effect the unblocking of an output for setting the access control in the respective partial storage device, for effecting the connecting-through of the connection, and for marking the sequence-control of the respective unit when the unit, as well as the partial storage device, which are indicated in the respective program step by the contents of the instruction register, have not already been connected with another partial storage device or with another unit. Furthermore, and in accordance with the invention, the arrangement is made in such a way that the blocking effect of the sequence control circuit will not only become effective when the marked unit and the partial storage device which is assigned thereto are connected with each other, but the marking will also be released or effected whenever the sequene control of the respective unit is still marked, that is, when the sequence control in this particular unit is still performing further operating cycles without a connection with one of the partial storage devices being required.

By the cooperation of the connecting control and the connecting control circuit on one hand, and the sequence-control circuit of the control unit on the other hand, a mutual overlapping of different programs is reliably avoided. As long as one of the units, togther with the partial storage device assigned thereto performs a program or part of a program, or else as long as it alone performs a program or part of a program, both the connecting and the sequence-control circuit have such a blocking effect that the performance of this program cannot be disturbed by the program running in other parts or sections of the system.

The above mentioned and other features and objects of this invention will become more apparent and the invention itself will be best understood by reference to the following description of an embodiment of the invention taken in conjunction with the accompanying drawings, in which:

FIG. 6 shows the basic circuit diagram of the control unit.

Figure 1:
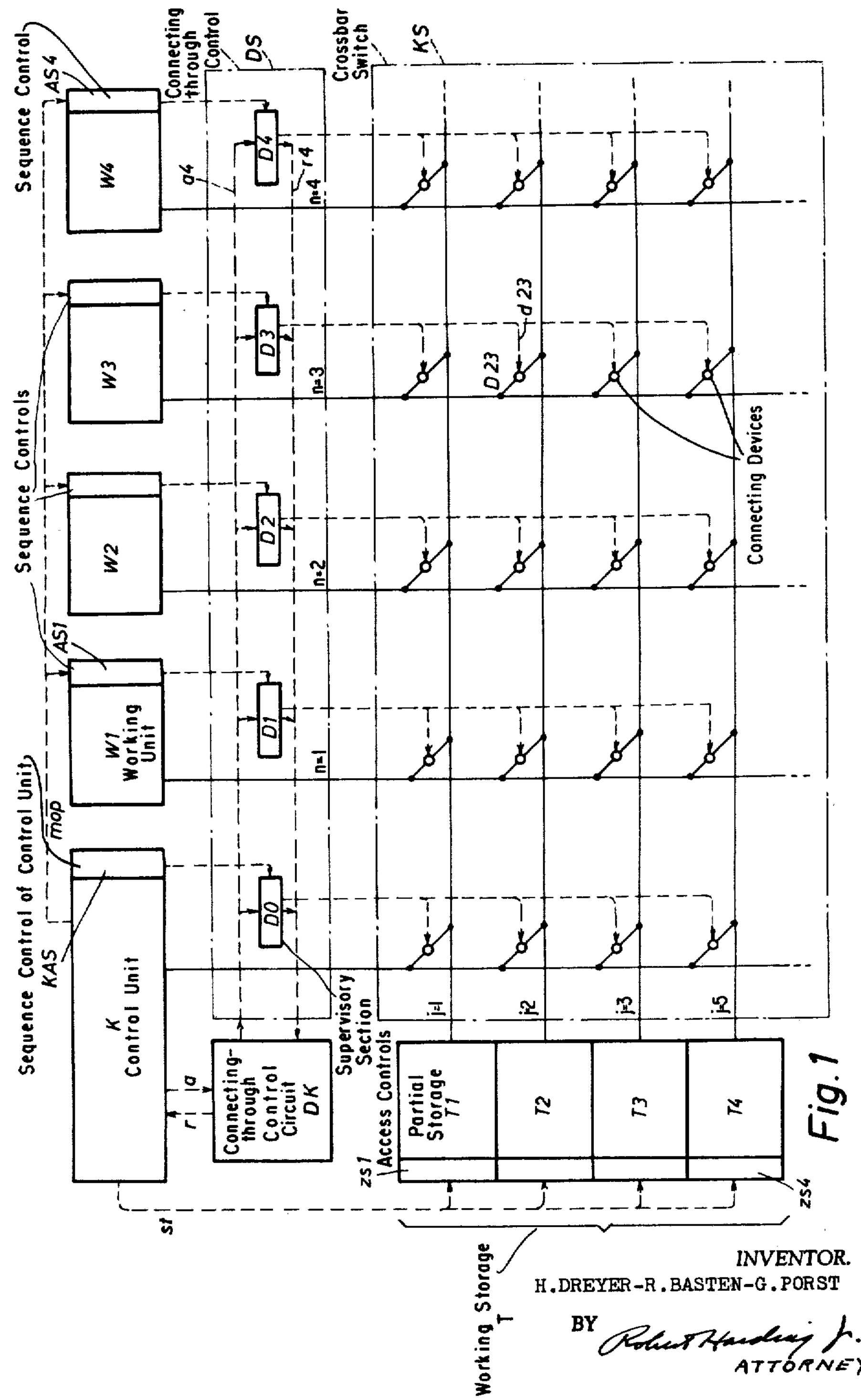
FIG. 1 shows the block diagram of a system according to the invention comprising one control unit, four units and four partial storage devices.

The construction of an electronic system according to the invention is shown in FIG. 1. In this FIG. 1 four units W1 through W4 are provided, as well as one working storage which is subdivided in four partial storages T1 through T4. Both the partial storages and the units are connected with each other by means of a crossbar switch KS. Line conductors are connected with the partial storage devices, and the column conductors of the crossbar switch are connected with the units. The connecting-through from the line or horizontal conductors to the column or vertical conductors is effected with the aid of connecting devices D*jn*, which are numbered in accordance with the intersecting points of the crossbar switch. In these references the letter *j* indicates the line, and the letter *n* the column. Thus, for example, the connecting device D23 connects the partial storage device T2 with the unit W3. The marking of the connecting-through devices is effected by the connecting-through control device DS. This connecting control comprises one supervisory section for each unit, e.g. for the unit W4, the supervisory section D4. These supervisory sections are connected via the connecting-through control circuit DK with the control unit K over several control input control leads *a* and return-indicating leads *r*.

A separate sequence control is provided for each of the units, denoted in FIG. 1 for W1 by AS1, etc., for W4 by AS4, and for the control unit itself by KAS. The sequence controls are connected with the control unit via the marking leads *mop*.

As will be seen from FIG. 1, one access control ZS*j* is assigned to each partial storage device T*j*. For instance ZS4 is assigned to the partial storage device T4. The control unit is connected with the access control of the individual partial storages over control leads *st*.

In FIG. 1 only one horizontal or line conductor is shown for each partial storage, and only one column or vertical conductor for each unit. Fundamentally, such a limitation to only one transmission line is possible. However, when transmitting binary informations, it will be necessary to transmit both statements, the yes-statement as well as the no-statement, for instance, by means of positive and negative impulses. When employing self-clocking writing and reading systems, the transmission may also be effected by impulses having one polarity only; this, however, is entailed by the limitation to a given pulse-repetition frequency.

For synchronizing purposes it is favorable to connect the units and the partial storages not only by means of an information transmission line, but also by means of a transmission path for clock pulses. For this reason it is appropriate to design the crossbar switch as a multiswitch serving the connecting-through of a clock-pulse transmission line and of at least one information transmission line. One favorable type of embodiment is shown in the right-hand half of FIG. 2. At one intersecting point of the crossbar switch, which is designed as a triple switch, the information output line *wa* of a unit is connected with the information-input line *te* of a partial storage, and the information-output line *ta* of a partial storage is connected with the information-input line *we* of a unit, and the clock-pulse transmission line *wt* of a unit is connected with the clock-pulse transmission line *tt* of a partial storage device.

Figure 2:
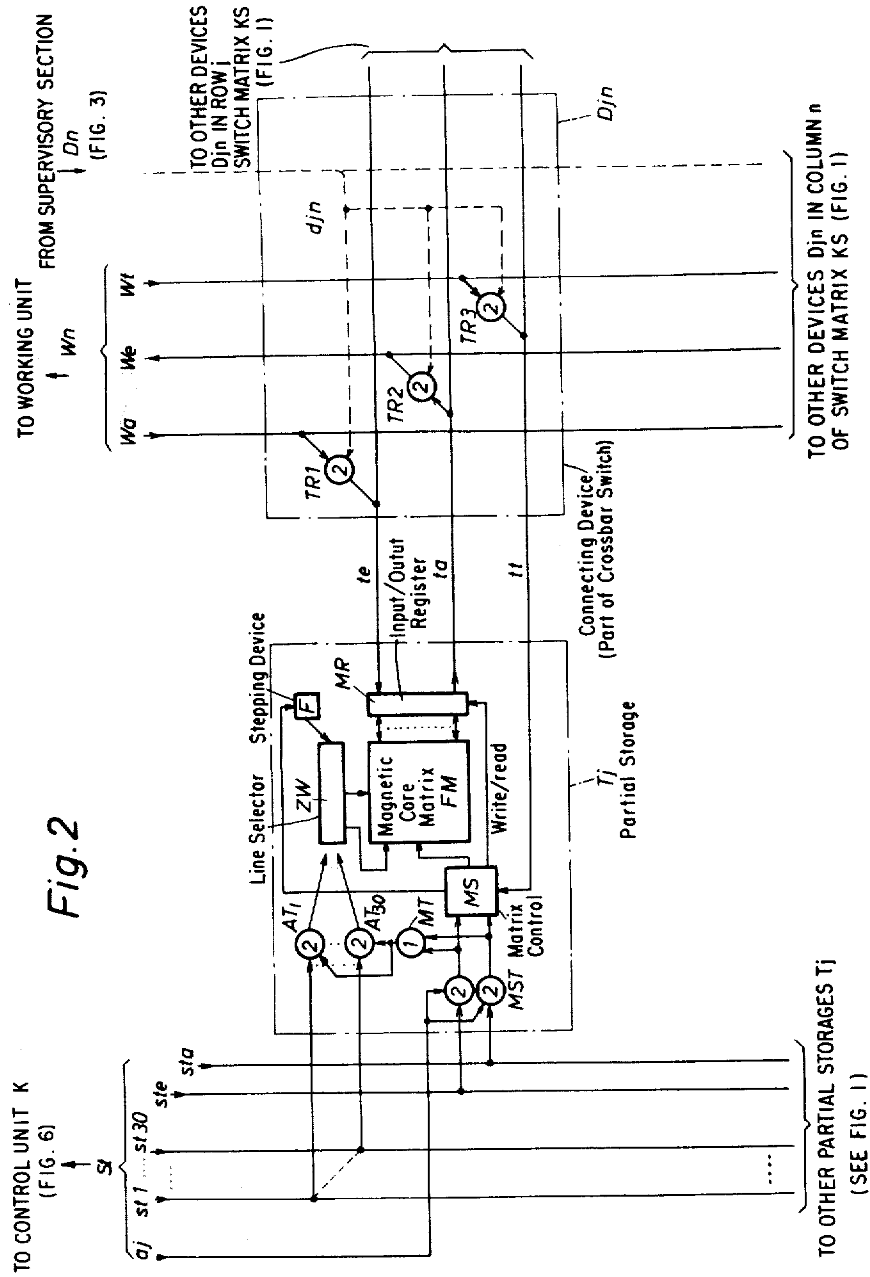
FIG. 2 shows the basic circuit diagram for a partial storage device with an access control and the associating coordinate lines with connecting devices.

In FIG. 2 the connecting device D*jn* connects the line conductors of the partial storage T*j* with the column conductors of the unit W*n*. At the intersecting points of line and column conductors which are assigned to each other the connecting gates TR1, TR2 and TR3, e.g. transistors, are connected, and the connection is established over these whenever a corresponding marking is applied to the marking line *djn* of the connecting device D*jn*. The gate TR1 is adapted to connect *wa* with *te*. The gate TR2 is adapted to connect *we* with *ta* and likewise TR3 is adapted to connect the clock lines *wt* and *tt*.

The left-hand half of FIG. 2 shows the construction of a partial storage T*j* and of the associated access control. A magnetic-core matrix FM may be used as the actual storage device. At the input/output side, this matrix is connected with an input/output register MR, and in the example under consideration, the information to be transmitted can either be fed in series to this register or may be taken off therefrom. Controlling of the information transmission is performed by the matrix control MS which is synchronized by clock pulses transferred via the lines *wt* and *tt*.

The matrix control device MS is capable of being set via the input gates MST, either to the position "Writing" or "Reading." Corresponding set pulses are applied from the control unit via the control leads *ste* or *sta* respectively.

As has already been shown in FIG. 1, each of the partial storages is provided with an access control. This access control (see FIG. 2) consists of a line selector ZW and of the gate circuits AT, MT, and MST. In addition thereto a stepping device F is connected with the line selector.

According to the invention, the access control of the partial storages is designed in such a way that the line selector, in accordance with the marking of the input control leads *st*1 . . . *st*30, is only capable of being set when the calling line *aj*, which is assigned to the partial storage, has been marked, and when a setting pulse *ste* or *sta* is being applied from the sequence control of the control unit. (The sequence-control of the control unit is denoted in FIG. 1 by KAS. The construction and the mode of operation thereof will be described hereinafter with reference to FIG. 6.)

In the exemplified embodiment, according to FIG. 2, thirty input control leads are provided for the selection of one thousand different lines. These control leads correspond to a three-digit decimal address. Of course, the access control can also be modified in such a way that the line selector is capable of being set by set pulses which are applied in series, and which are fed-in via one or several control leads. On account of this, it is possible, by making sacrifices with respect to time, to reduce the number of the necessary control leads.

In the arrangement, according to FIG. 2, two AND gates, represented by input gating circuit MST, are provided, which, upon marking of the calling line *aj*, are only unblocked or conductive when a set pulse is applied via one of the lines *ste* or *sta*, respectively The set-pulse transmission lines, just like the input control leads, are connected with the input gating circuits of all partial storages. However, only the input gating circuit MST of that partial storage T*j* which is called during a step of the program can open during that step. For example, if MST in FIG. 2 is opened, then thereby, and via the OR-gate MT, the input gate circuits AT, which are designed as AND-gates, will be unblocked, and the line selector will be set in accordance with the marking of the control leads.

Likewise only the matrix control of the called partial storage can be set to the position "Reading" or "Writing."

After the line selector and the matrix control have been set, the respective partial storage is ready to operate. By means of a first clock pulse, applied via the clock-pulse transmission line to the matrix control, the desired information (the location of which is designated by the position of the line selector) is transmitted in parallel from the magnetic-core matrix FM to the input/output register MR at the reading from the storage and is thereupon called up in series from this register by means of further clock pulses. A final clock pulse (or else one of the aforementioned clock pulses) is likewise applied via the matrix control to the stepping device F, which is adapted to step on the line selector to the next successive address. In the case of a series interrogation or reading of the matrix the input/output register MR may be dispensed with.

Those skilled in the art will appreciate that while the blocks MS, ZW, F, and MR are only described schematically above in terms of the functions performed thereby, the construction of each such block amounts to what would be considered a routine engineering design detail. Consider first the function of the blocks ZW and F. As explained above the block ZW is initially set by signals translated via lines *st*1 . . . *st*30, which signals designate the first storage word location in the matrix FM to be coupled to the common in/out buffer register MR. As is further indicated above, following such initial setting of the line selector ZW, the selector is stepped along in rhythm with pulses arriving on line *tt*, to designate successive storage word locations in the matrix FM until the connection between the unit W*n* and the partial storage T*j* is broken. This is, of course, a quite simple operation which is well understood by those who are knowledgeable in the construction of random access storage systems, and may be easily manifested, for example, by a 30 stage ring counter or a shift register, operating in conjunction with a suitably constructed pulsing device (F), which is actuated upon completion of each preceding transfer operation between the matrix FM and register MR, provided that the organization of FM is such that each word stored therein is selected by a signal on a single line.

Similarly, those knowledgeable in this art will also appreciate that the matrix control MS is a control circuit arranged to selectively translate reference timing signals on line *tt* into read or write drive signals which control the transfer of intelligence between the matrix FM and register MR, and upon termination of the drive signals, to forward a control impulse to the stepping device F. As the read/write drive circuitry for control of the transfer of information between matrix storage word locations and a common read/write register is well understood by those skilled in the art (note, for example, FIGURES 8–13*a*, "Digital Computer Components and Circuits," R. K. Richards, page 383) the details of MS have been omitted.

Figure 3:
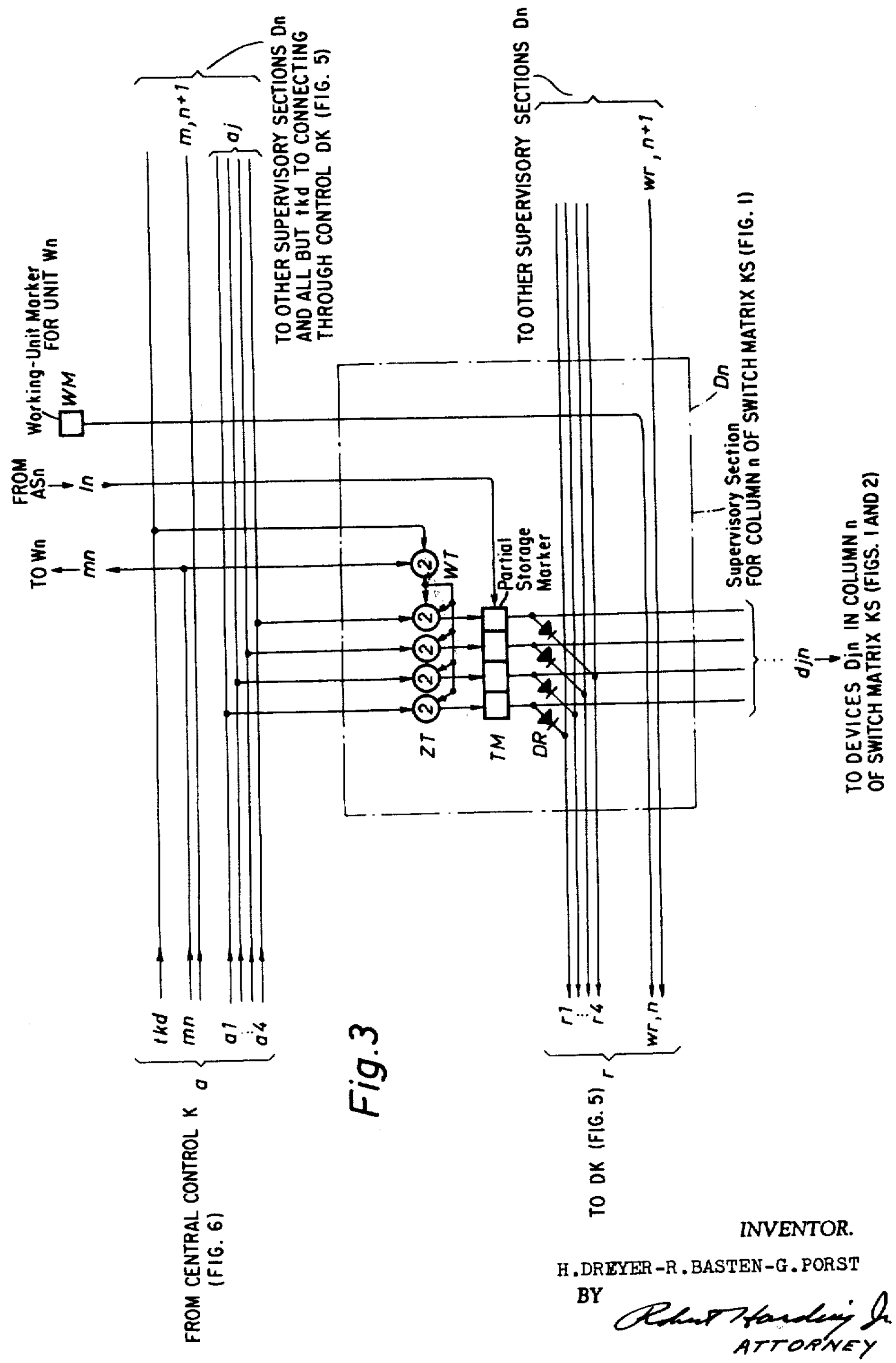
FIG. 3 shows a supervisory unit of the connecting control with a partial storage marker and the associating controlling and return indicating lines.

In FIG. 3 the construction of a supervisory section D*n* is shown. One such supervisory section is assigned to each of the units and is constructed of input-gating circuits ZT and WT and a partial storage marker register of bistable elements TM, in such a way that the partial storage marker, via input-control leads *a*1 through *a*4, can only be set by the feeding-in of a sequence-clock pulse *tkd* from the control unit when a calling line *mn* of the associating unit W*n* is marked at the same time, and in such a way that the outputs of the partial storage marker are connected with the control leads *djn* of the connecting devices D*jn* (*j*=1–4). The mode of operation of the input-gating circuits within the supervisory section D*n* corresponds to the mode of operation of the access control of the partial storage. Instead of the line selector, the partial storage marker is used as the storage means in this case. The required storage capacity, however, is relatively small in accordance with the number of the partial storages. The markings of the lines *a*1 through *a*4 are stored in corresponding bistable stages of the partial storage marker register TM, upon opening or unblocking of the input-gating circuits.

Figure 4:
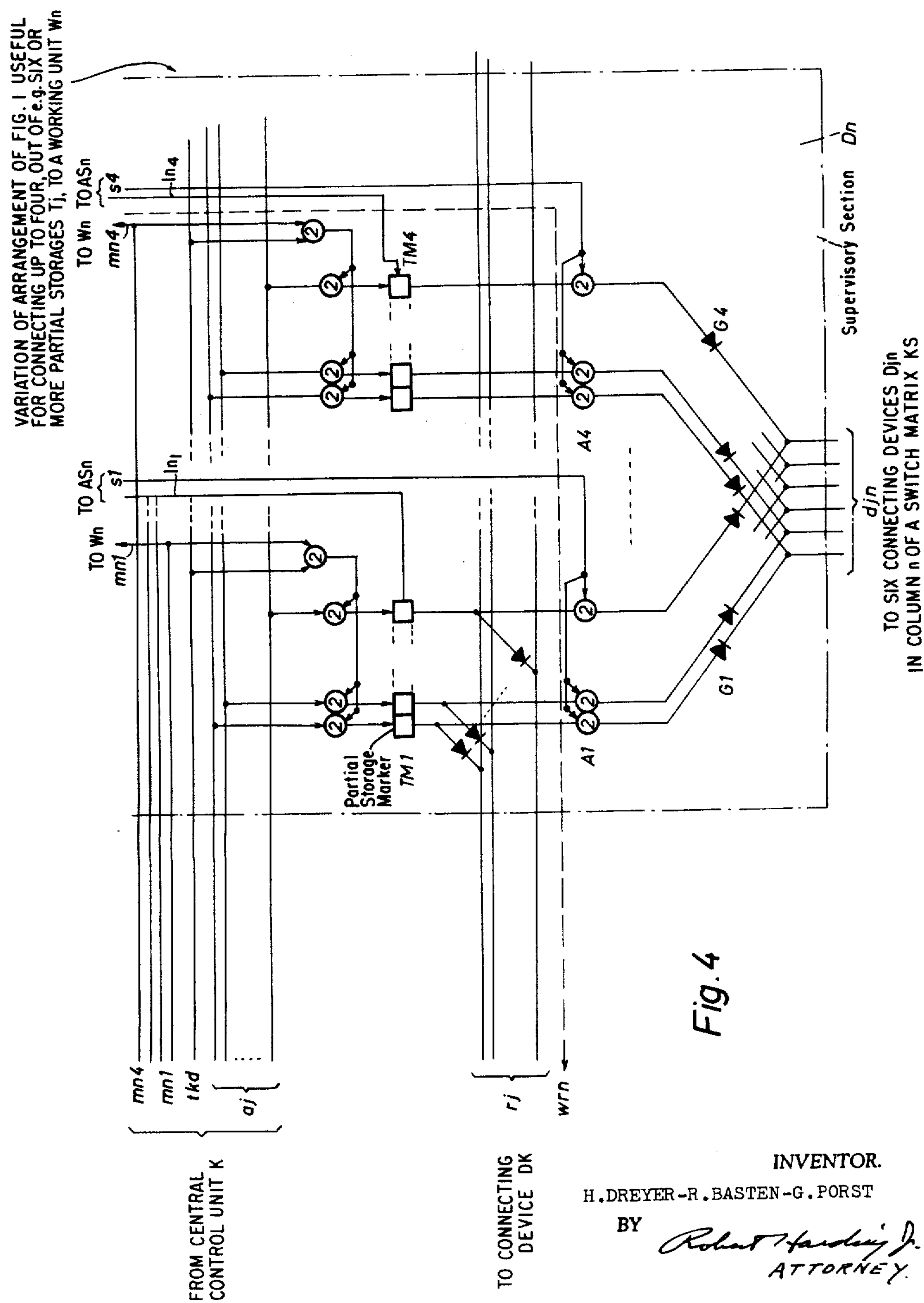
FIG. 4 shows a supervisory unit comprising several partial storage markers.

As may be noted with reference to FIGURE 4, where each working unit is connectable to as many as 4 partial storages, it would be impractical to provide only 4 partial storages for the entire system since that would defeat the purpose of the present invention. Accordingly, such a system should include a minimum of 6 partial storages, as indicated in FIGURE 4 by the 6 leads *djn* emanating from the block designated D*n*. It is emphasized that the arrangement shown in FIGURE 4 represents a variation of the supervisory section shown in FIGURE 3, which variation is not be be considered in connection with FIGURE 1, since the block diagram in FIGURE 1 relates to a system for establishing one-to-one connections.

The input-gating circuit WT is only opened upon application of the clock pulses *tkd*, when the respective unit has been called via the line *mn*, and only upon opening of the gate WT will the AND-gates ZT be opened, thus permitting the setting of the partial storage marker TM. Directly with the setting of the partial storage marker the connecting-through of the desired connection is effected.

The partial storage marker TM remains set as long as information is to be transmitted between the respective unit and the partial storage which is designated or identified by the partial storage marker. Subsequent to the transmission of the information the partial storage marker, as will be described hereinafter, will be restored to normal via a release line 1*n*. The release line 1*n* is connected with the sequence control AS*n* of the respective unit. By restoring the partial storage marker, the partial storage itself will again be set free for cooperating with other units.

On the output side, the individual storage cells of the partial storage marker TM are connected with corresponding return-indicating lines *rj* (*j*=1–4), via decoupling diodes DR. In the discussed example of embodiment, the number of the partial storage (i.e. 1 out of *j*) is stored in a non-coded manner in the partial storage marker TM. The number of the input-control lines *aj*, the number of the storage cells TM, as well as the number of the return-indicating lines *rj*, accordingly, corresponds to the number of partial storages employed. Generally only one of the storage cells of the partial storage marker is marked because the respective unit cooperates only with one partial storage. However, the arrangement, according to the invention, can also be made in such a way that one of the units simultaneously cooperates with several partial storages e.g. for sorting purposes. In this case it is appropriate to provide a supervisory section D*n* in the connecting-through control DS for this particular unit W*n*, comprising several partial storage markers, and to connect them via an output control with the control leads *djn* of the crossbar switch.

A corresponding supervisory section D*n* via which e.g. four partial storages can be assigned to a two-way sorting unit, is shown in FIG. 4. The supervisory section according to FIG. 4, comprises four partial storage markers TM1 through TM4, which are connected via output-gating circuits (AND-circuits) A1 through A4 and via the rectifier groups G1 through G4, with the control leads *djn* serving the actuation of the connecting-through devices D*jn*. By the action of the rectifier groups, the outputs of these output-gating circuits are coupled by means of OR-conditions. The output-gating circuits are connected via the access control leads *s*1 through *s*4 with the sequence control of the unit W*n*. By means of the sequence control, and with respect to different operating cycles, the required partial storage can be connected with the unit by marking the corresponding one of the control leads *s*1 through *s*4.

The setting of the partial storage markers TM is effected, as with the other supervisory sections, via the partial-storage calling lines *aj* and the unit-calling lines *mn* under the control of the connecting-through clock pulses *tkd*. In the exemplified embodiment, as shown in FIG. 4, four unit-calling lines *mn*1 through *mn*4 are assigned to the unit W*n*, so that the partial storage markers TM1 through TM4 can be set in the course of four successively following program steps. It is still to be pointed out that in this case the sequence control of the unit is to be arranged in such a way that the return-indicating line *wrn* will only be marked after all of the four partial storage markers have been set.

If, in the case of a coupling of one unit with only one partial storage, the setting of the partial storage to reading or writing is effected by the control unit, then it is advantageous likewise to lead the control leads *ste* and *sta* via the crossbar switch, and to mark them by the sequence control of the respective unit, whenever this unit is supposed to cooperate with several partial storages. It is still to be mentioned that, in order to save these lines, the access control of the individual partial storage, as well as the matrix control, can be designed in such a way that the changeover from reading to writing is effected via the clock-pulse line *tt*, e.g. in that certain groups of code pulses are decoded in the device MS, or in that impulses of a different polarity are applied via the transmission line *tt*.

Figure 5:
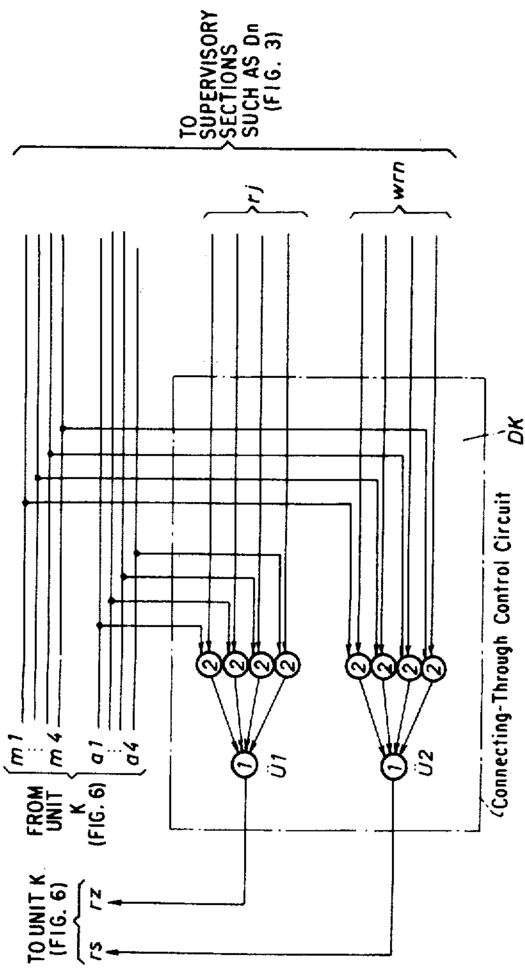
FIG. 5 shows the connecting control circuit with a supervision of the return indicating lines relating to the occupancy of the partial storage devices and units.

The set-up of the connecting-through control circuit is shown in FIG. 5. This circuit arrangement comprises a supervision Ü1 which is composed of gate circuits and is connected on one hand with the return-indicating lines *rj* and, on the other hand, with the input-control leads *a*1 through *a*4 of the connecting-through control, and is designed in such a way that it applies a blocking potential to the sequence-control circuit of the control unit, via a return-indicating line *rz*, whenever the partial storage is designated by the marking of a line *aj* and is still connected with one of the units. The blocking is effected because one of the AND-gates is opened or unblocked in the case of coincidence and marks the line *rz* via the OR-gate which is arranged subsequently to the AND-gates.

In the same way a further supervision Ü2, is connected on one hand, via return-indicating lines *wrn* with the sequence controls of the units and, on the other hand, with the unit-calling lines *m*1 through *m*4, and is laid out in such a way that it applies a blocking potential to the sequence-control circuit of the control unit via a return-indicating line *rs* whenever the sequence control of the unit which is designated by the marking of a calling line *mn* is still marked.

In FIG. 6 the basic circuit diagram of a control unit is shown. For the reception of the instruction words a program register BR consisting of three parts is provided and can be connected via the input line *we* with a partial storage. The three sections or parts BR1, BR2 and BR3 are laid out for receiving a sequence address, an address, and an operating instruction. The sections of the program register are connected via AND-gates U1, U2, and U3 with 2 decoders E1 and E2. The decoders serve to convert the data, which is fed in a coded manner into the program register, into individual markings of the different calling and control leads. As will be described hereinafter in connection with the description of the sequence-control circuit, the connecting-through of the transmission paths from part of the program register to the decoders is controlled by the sequence control in accordance with the blocking or unblocking instructions which are supplied by the marking of the lines *rz* or *rs*, respectively, from the connecting-through control circuit.

The decoder E1 either converts the sequence address which is stored in BR1, or the address which is stored in BR2, on the one hand, into call markings *aj* for the partial storage T*j* which is designated by the address, and on the other hand, into the markings of the control leads *st*1 . . . *st*30 corresponding to the address. The decoder E2 is adapted to ascertain from the operational instruction the number of the unit, and correspondingly marks one of the calling lines *mn*. Furthermore, this decoder takes out the instruction as to whether there is concerned a writing or reading process, and then either marks the line *ste* or *sta*. In addition thereto, the marking of the desired function sequence is determined in the decoder E2 from the operational instruction which marking is indicated via one of the marking lines *mop* of the sequence control of the respective unit.

In the discussion above, the decoders E1 and E2 are characterized in terms of the inputs thereto and the outputs thereof, the circuit details having been omitted. Those skilled in the switching arts, however, will appreciate that such decoders comprise translating network configurations, of well understood design, which are arranged to convert signals on one or more input leads into a corresponding set of signals appearing on one output lead in each of a plurality of groups of output leads. Such circuits are basically well known and are described, for example, on pages 292 to 294 of the book "The Design of Switching Circuits," by W. Keister, A. E. Ritchie, S. H. Washburn, D. Van Nostrand Co., sixth edition (May 1957).

The actual sequence control consists of a master clock TG, which is connected via and AND-gate U4 with a ring counter Z, as is shown in FIG. 6. The output of a counter stage is assigned to each sequential cycle. The number of stages of the ring counter is dependent upon the length of the word whenever the informations are supposed to be transmitted in series. In the exemplified embodiment under discussion, two counter stages *t*1 and *t*2, several information reading stages *tba*, and three further stages *t*3, *t*4, and *t*5 are provided. The outputs of the counter stages are connected with a sequence-control circuit which is composed of AND-circuits and OR-circuits.

At the beginning of a program step the counter Z is set into the normal position, so that the output of the stage *t*1 is marked. The marking *t*1 opens or unblocks the OR-gate O1 and, consequently, also the AND-gate U1, so that the sequence address which is stored in BR1, is applied to the decoder E1 and, via output lines *aj* thereof, calls up the partial storage in which the instruction code (word), which is to be processed during this program step, is stored.

The marking *t*1 also opens the OR-gate O3 and thereby prepares the opening of the AND-gate U5. Upon opening of U5 the gate U4 will also be unblocked, and the next clock pulse from TG will effect the stepping-on of the counter to the stage *t*2 via a delay element V which is arranged subsequently to U4. However, the supervisory gate U5 will only open when the connecting-through control circuit DK (FIG. 5) does not deliver a blocking signal, i.e. when the complementary signals *rs* and *rz*, which are derived via reversing stages not shown in the drawing, are applied together with the marking *t*1 or *t*3 applied via O3. Furthermore, in the position *t*1 and via the output of O1 the decoder E2 is also called up, which, in this particular case, effects the marking of the calling line *m*0 for the partial storage marker of the control unit in D*o*, as well as the setting-pulse line *sta* for the reading or sending-forward purpose. In the course of this operation the supervisory section of the connecting-through control which is assigned to the control unit occupies a special position, as the marking of *m*0 is without influence upon the return-indication via *rs*.

Upon stepping the sequence control to the counter position *t*2 the gate O1 will remain unblocked, so that the contents of the program register BR1 are again applied to the decoder E1. However, the control gate O2 is also unblocked by *t*2 and, consequently, and in dependency upon the marking by E2, one of the output gates U8 or U9 is also unblocked, whereby the setting of the respective partial storage is effected. The marking *t*2, via the OR-gate O4, also opens the lead-in for clock pulses via U4, so that the counter will be stepped on. At the same time, the OR-gate O7, whose output is connected with the clock-pulse line *tkd* for "setting" the partial storage marker is unblocked by the marking of *t*2.

Subsequently to the stepping-on of the counter to the first stage *tba*, the OR-gate O6 is unblocked, thereby unblocking, via the AND-gate U6, the output of clock pulses via the clock-pulse line *tw*. These clock pulses are adapted to control the matrix control MS, which has already been set during the sequential cycle *t*2 of the called-up partial storage. The counter of the sequence control is also stepped on by each clock pulse serving the data or information transmission, because the gate O4 is kept open via the output *tb* of O6 and, consequently, also gate U4. While the counter passes through the stages *tba* for the call-up of instructions, the program code or instruction word is stored via the information-input line *we* into the program register BR. In this case the number of stages *tba* corresponds to the number of storage cells of the register BR.

After the transmission of the instruction code has been completed, the counter will be stepped on to the position *t*3. By the marking of *t*3 via the gate O8 and the gate U2, the address, as stored in the register BR2, is applied to the decoder E1, and via the gate U3, the operational instruction, as stored in the register BR3, is applied to the decoder E2. In addition thereto, the erasing of the partial storage markers in DO is effected by the marking *t*3 via the release line 1*o* of the control unit, because the transmission of the instruction code has already been completed.

Via the outputs *aj* of the decoder E1, and *mn* of the decoder E2, the partial storage as marked or designated by the instruction is called, as well as the likewise designated unit. The blocking signals which are thereupon likely to be transmitted by the connecting-through control circuit will then block the AND-gate U5 whenever the partial storage or the unit is occupied. If the establishment of the connection is permitted by the connecting-through control circuit DK, then the gate U5 and, consequently, U4 will open, so that thereupon the counter will be stepped on to position *t*4.

The marking of *t*4 will again open the gates O2 and O7, thereby permitting the setting of both the access control and the partial storage marker. Since *t*4, via O4, also opens or unblocks the gate U4, the counter Z will be stepped on to *t*5. The final sequential cycle of the program step is thus attained. The marking of *t*5 will then open the AND-gate U7 and will effect the connecting-through of the corresponding outputs of the decoder E2 to the marking lines *mop* for setting the sequence control of the called unit. At the same time, *t*5 will effect the opening or unblocking of the gates O4 and U4, so that by the next successive clock pulse from the master clock, the counter of the sequence control of the control unit will jump back into its normal position, thus permitting the start of the next step of the program.

Summarizing the above sequence of events in terms of system effects, with counter Z of control unit K (FIGURE 6) in its initial state, or position, *t*1, a code representation stored in register BR1 is translated into markings of one output line of the group *aj* and one output line of the group *st*1 . . . *st*30, via the decoder E1. Simultaneously, via decoder E2, the output of counter stage *t*1 is translated into a marking of the line *mo* of the group *mn*, which line extends to supervisoroy section D*o* (FIGURE 1) of the central control K, and into similar markings of selected leads in each of the groups of output leads feeding the gates U7, U8, and U9. Upon the occurrence of the next master clock pulse, counter Z will step to position *t*2 providing that the line selected from the group *aj* is not occupied. This will usually be the case because of the arrangement of the main connecting program.

With counter Z of control unit K in position *t*2 the conditions manifested for counter position *t*1 are repeated, and in addition the lines *tkd* and *sta* (FIGURES 2, 3, and 6) are marked, thereby establishing a cross-point connection between the registers BR1 to BR3 of control unit K and the partial storage T*j* containing the next program instruction.

Upon occurrence of the next master clock pulse, counter Z proceeds to step through the sequence of positions *tba* under the control of the master clock pulses, and transfer control signals are applied via line *tw* and the cross-point connection established in the preceding counter step, to the addressed partial storage T*j*, in rhythm with the stepping of the counter. The transfer control signals advance the next program instruction into the registers BR1–BR3, the information thus stored including a next control address (register BR1), an address code (register BR2), and an address and instruction code (BR3) respectively indicating the partial storage and working unit W*n* which are to be connected, and the transfer operation (read/write) to be initiated between such connected units.

When the counter arrives at position *t*3, the connection via D*o*, between central control system K and the partial store containing the program instruction word, is terminated via the signal on lead 1*o*, while simultaneously signals in registers BR2 and BR3 are being translated, via decoding networks E1 and E2, respectively, into a marking of a selected line in each of the groups *aj* and *mn*, respectively. The supervisory section D*n* (FIGURE 3), corresponding to the marked lead *mn*, then determines the condition of the signals *rs* and *rz* (FIGURES 5 and 6), and thereby controls the further advance of the counter Z of control unit K (FIGURE 6). Briefly reviewing the function of these signals, if either the called partial storage *tj* or the addressed working unit W*n* are occupied at the time of occurrence of signals *aj* and *mn*, respectively, during interval *t*3, the counter will be prevented from advancing until such time as the marker TM, of supervisory section D*n* (FIGURE 3) is reset via line 1*n*, and until the marker WM of the working unit W*n* (FIGURE 3) is reset. Upon the occurrence of such resetting the counter Z advances, to position *t*4 whereupon lead *tkd* (FIGURES 3 and 6) is marked, thereby setting TM (FIGURE 3), and the outputs of decoders E1 and E2, translated during counter position *t*3, are repeated. Additionally one of the lines *ste*, *sta*, is marked to designate the type of transfer connection (read/write) which is to be established. Referring to FIGURE 2 it is seen that this sets up the local controls MS and ZW of the selected partial storage T*j* for subsequent read-in or read-out of data, between the selected storage and the selected working unit, under control of local control signals W*t* to be forwarded by the access control AS*n* of the selected working unit W*n*.

The operation of the local access control AS*n* occurs as follows. At the next master clock pulse the central control unit counter Z (FIGURE 6) steps to position *t*5 establishing a signal mark on one of the leads *mop* which transfers control of the connection established during counter position *t*4 to the local access control AS*n*. The counter thereupon resets to position *t*1 upon occurrence of the next master clock pulse and the control unit is then ready to begin a new programmed cycle of operation to establish a connection between another working unit and another partial storage.

From the above it should be appreciated that the system of this invention basically functions as a revertive control system in which connections are set up by the central control unit and the control of each such connection is thereupon given over to a local or secondary control unit AS*n*, freeing the central control unit to imitate other connections as required by the program. It will be appreciated that the structural organization of the secondary controls AS*n* will depend upon the function and structure of the corresponding units W*n*.

In the described embodiment of the invention, it has been assumed that the order of succession with respect to the processing of the instructions is determined by the sequence address. On the other hand, it is also possible to determine the order of sequence in which the individual instructions are supposed to be carried out by the order of succession of their positions within the program register (e.g. partial storage T1). In this case it is superfluous that the instruction code carries a sequence address. Accordingly, as program registers (instruction register), only the parts or sections BR1 and BR2 have to be provided and the latter parts are then no longer connected with BR1, as is denoted by the dashlines in FIG. 6. Instead of the register sections BR1 for the sequence or successive address, a control sequence counter BR1 is then provided which is stepped on by one step during each step of the program by the action of a stepping-clock pulse *ft*. This stepping-clock pulse can only be derived from the stages *t*3 through *t*5 of the counter Z.

In the hitherto described example it has been presupposed that the information is transmitted in series via the crossbar switch. However, in a system according to the invention, it is also possible to design the crossbar switch to be suitable for a parallel transmission. In this case, each unit and each partial storage will have to have a corresponding plurality of information-transmission lines, which are simultaneously connected-through under the control of the respective partial storage marker.

In various data-processing systems it is desirable that individual units or partial storages can be connected among each other. For this reason it appears to be of advantage to provide further line or horizontal lines in the crossbar switch which are connected with each other in pairs, serving the connection of the units among each other, or further column or vertical lines likewise connected among each other in pairs and serving to connect two partial storages to each other. For the purpose of enabling a better understanding, it is assumed that in the system, according to FIG. 1, instead of the partial storages T3 and T4, a direct connection exists between the third and the fourth horizontal line wires. In this case, the unit W1 can be connected with the unit W4 in that by a first instruction the partial storage marker is set in D1 by the calling line *a*3, and the partial storage marker in D4 by the calling line *a*4. The connection between W1 and W4 will then extend via the vertical column wires of W1, via the horizontal line wires of T3 and T4, and via the vertical column wires of W4.

What is claimed is:

1. An electronic data-processing system comprising a central program control unit, a data-processing unit, backing-storage units, input, and output units, a working storage subdivided into a plurality of partial storages, electronic crossbar switch means capable of providing simultaneous direct connections between any of said partial storages and any of said units, a separate sequence control assigned each unit, means in said control unit for marking each said sequence control in accordance with a desired sequence of functions, and means in each sequence control for causing said sequence control to assume control of the operation of its associated unit, following a connection of said associated unit to one of said partial storages through said switch means by said control unit.

2. An electronic system, as claimed in claim 1, further comprising a separate access control for each partial storage, and means for setting said access controls in accordance with desired addresses within said partial stores.

3. An electronic system, as claimed in claim 2, in which the partial storages comprise magnetic-core storage matrices.

4. An electronic system, as claimed in claim 3, further comprising means for producing control pulses, means in the sequence control of the control unit for applying said control pulses to the access control, the access control of the partial storages comprising input control leads input-gate circuits, a calling line and a line selector, said line selector being settable only in accordance with the marking of input-control leads of the access control of a partial storage whenever a calling line associated with this partial storage has been marked and when a control pulse from said control pulse producing means has been applied to it.

5. An electronic system, as claimed in claim 4, further comprising a stepping device in said access control, and means for causing said stepping device, subsequently to the writing or reading from the storage matrix, to effect the stepping-on of the line selector to the next successive address within said storage matrix.

6. An electronic system, as claimed in claim 1, further comprising information transmission lines assigned to the partial stores and the units and means for producing clock pulses in the control unit, said means having output lines each carrying different clock pulses, the crossbar switch being designed as a multiswitch for effecting the connection of one of said clock-pulse output lines and of at least one of said information transmission lines between a partial store and a unit.

7. An electronic system, as claimed in claim 6, further comprising information input and output and clock pulse lines for the units, information input and output and clock-pulse lines for the partial storages, said crossbar switch being designed as a triple switch for effecting the connecting-through of the information output line of a unit to the information-input line of a partial storage, for effecting the connecting-through of the information output line of a partial storage to the information-input line of a unit, and for effecting the connecting-through of a clock-pulse transmission line of a unit to the clock transmission line of a partial storage.

8. An electronic system, as claimed in claim 1, in which only one line or column wire is provided in the crossbar switch for each unit and only one line or column wire is provided for each partial storage, means in the sequence control of the units for producing clock pulses, and means in the matrix control of the partial storages for producing clock pulses.

9. An electronic data processing system comprising a central program control unit, backing storage units, a data processing unit, input and output units, a separate sequence control for each of said units, a working storage subdivided into a plurality of partial storages, a separate access control for each partial storage, means controlled by said central program control unit for respectively coupling any of said units and the associated sequence control to any of said partial storages and the respective access control, and means in said central program control unit for controlling the conditioning of said access control of the respective partial storage to enable said sequence control of said coupled unit to control the transfer of data signals between said coupled partial storage and said coupled unit via said coupling means and said respective access control.

10. An electronic data-processing system comprising a central program control unit, backing storage units, a data processing unit, input and output units, a separate sequence control for each of said units, a working storage subdivided into a plurality of partial storages, a separate access control for each partial storage, means in said central program control unit for controlling the conditioning of said access control of the respective partial storage to afford access thereto independently of said control unit, means under the control of said control unit for selectively coupling said units to said partial storages, and means for releasing the desired sequence of functions by marking the sequence control in the respective unit, further means comprising a program register subdivided into several sections for receiving, storing, and releasing operating instructions, addresses, and sequence addresses.

11. An electronic system, as claimed in claim 10, further comprising control leads extending from said control unit, decoders in the central program control unit for converting addresses and operating instructions into marking potentials, and means for applying said marking potentials to said control leads.

12. An electronic system as claimed in claim 11, wherein said selectively coupling means includes an electronic crossbar switch for establishing connections between any partial store and any unit, a connecting-through control and a connecting-through circuit to control said electronic crossbar switch, means for causing cooperation between said connecting-through control, connecting-through control circuit, and the sequence control circuit of the control unit to prevent the connection between any busy unit and any busy partial storage.

13. An electronic system, as claimed in claim 12, in which the sequence control of the control unit is connected with a sequence-control circuit said sequence-control circuit comprising blocking and unblocking arrangement for marking the sequence control of the respective unit and setting the access control in the respective partial storage device.

14. An electronic system, as claimed in claim 13, further comprising means for producing a sequecne clock pulse, a supervisory section, assigned each unit, comprising input gate circuits and a partial storage marker, said partial-storage marker being settable only by the marking of the associated unit and a simultaneous sequence-clock pulse from said pulse producing means.

15. An electronic system, the supervisory section as claimed in claim 14, further comprising a plurality of decoupling diodes, return indicating leads connected to said decoupling diodes, the partial storage markers having individual storage cells the outputs of which are connected with corresponding return-indicating lines via said decoupling diodes.

16. An electronic system, as claimed in claim 15, further comprising input control leads for the connecting through control in which the connecting-through control comprises a supervision composed of gate circuits, connected on one hand, with the return-indicating lines, and on the other hand, with the input control leads of the connecting-through control, said connecting-through control comprising means for applying a blocking potential via a return-indicating line to the sequence-control circuit of the control unit, whenever the partial storage, which is designated by the marking of a line, is still connected with one of the units.

17. An electronic system, as claimed in claim 16 further comprising unit calling lines from the control input, in which said connecting-through control comprises a further supervision comprising inputs for said unit calling lines and gate circuits, said connecting-through control being connected, via return-indicating lines, with the sequenece controls of the units and with the unit-calling lines, and comprising means for applying a blocking potential, via a return-indicating line, to the sequence-control circuit of the control unit whenever the sequence control of the unit, which is designated by the marking of a calling line, is still marked.

18. An electronic system, as claimed in claim 15, further comprising an erase pulse lead connected to the pulse producing means for receiving an erase pulse therefrom, the sequence controls of the control units being respectively connected, via said control lead for erase pulses, with the respective partial-storage markers.

19. An electronic system, as claimed in claim 18, further comprising means in the sequence control for marking the control lead for erasing the partial-storage marker immediately after the information transmission has been completed.

20. An electronic system, as claimed in claim 13, in which the sequence control comprises a master timing device, a ring counter connected therewith via an AND-gate and a time-delay element, and means for causing said ring counter, to step by one step in response to the clock pulses from said master timing device, upon unblocking of said AND-gate.

21. An electronic system, as claimed in claim 20, in which the ring counter has two counter stages, several information-reading stages, and three further stages, the outputs of said stages being connected with a sequence-control circuit comprising AND-circuits and OR-circuits.

22. An electronic data-processing system comprising a plurality of partial storages; a plurality of operating units including data processing units, input and output units, and a central program control unit; crossbar switch means capable of providing simultaneous connections between any of said partial storages and any of said units; means coupled to said switch means, said units, and said partial storages for selectively establishing a connection through said switch means between an idle one of said units and a selected address in an idle one of said partial storages; and a plurality of sequence control means individually assigned to said units for taking over control of the further operation of said one of said units, said one of said partial storages, and the said connection therebetween following the said establishing of the said connection, whereupon said central program control unit is free to immediately initiate the establishment of another connection in association with another program step.

23. An electronic data processing system comprising a plurality of partial storages; a plurality of operating units including data processing units, input and output units, and a central program control unit; first means coupled between said central control unit and said partial storages for selecting an address in one of said storages; second means operated in association with said first means coupled between said central control unit and said partial storages for specifying a transfer operation to be performed in relation to said address selected by said first means; third means operated in association with said first means and coupled to said units and said storages for connecting any idle one of said units and any idle one of said storages under the control of said central control unit, and sequence control means associated with each said unit for taking over the further control of said connected unit and storage and the said connection therebetween following the establishment of the said connection, whereupon said central program control unit is free to immediately initiate the establishment of another connection in association with another program step.

24. An electronic data processing system comprising a plurality of partial storages; a plurality of working units adapted to operate upon data signals of the kind stored in said partial storages; means interposed between said working units and said partial storages for establishing selective transfer connections therebetween; a central program control unit which is cyclically operative to examine program instructions stored in a predetermined one of said partial storages and to set up a transfer connection via said connection establishing means between at least one of said partial storages and at least one of said working units in accordance with each said examined program instruction; and means individually associated with said working units under the control of said central control unit for seizing and independently maintaining control of each said transfer connection set up by said control unit while said control unit proceeds to execute the next cycle of program instruction examination.

References Cited in the file of this patent

UNITED STATES PATENTS 2,604,262 Phelps ---------------- July 22, 1952
2,869,111 Young ---------------- Jan. 13, 1959
2,945,211 Gibson et al. ------------ July 12, 1960